US00RE33880E

United States Patent [19]

Yamazaki et al.

[11] E Patent Number: Re. 33,880

[45] Reissued Date of Patent: Apr. 14, 1992

[54] POUCH OR SACK FOR PACKING AND LAMINATE FILM THEREFOR AND METHOD FOR PRODUCING THE POUCH

[75] Inventors: Shokichi Yamazaki, Hanno; Shigeyuki Oshima, Tokyo; Yoshiji Moteki, Kitaadachi, all of Japan

[73] Assignee: Kabushiki Kaisha Hosokawa Yoko, Japan

[21] Appl. No.: 505,347

[22] Filed: Apr. 5, 1990

Related U.S. Patent Documents

Reissue of:

[64] Patent No.: 4,778,058
Issued: Oct. 18, 1988
Appl. No.: 98,880
Filed: Sep. 21, 1987

[30] Foreign Application Priority Data

Mar. 19, 1987 [JP] Japan ..... 62-40773
Jul. 31, 1987 [JP] Japan ..... 62-192071
Sep. 8, 1987 [JP] Japan ..... 62-136872

[51] Int. Cl.[5] ..... B65D 5/59

[52] U.S. Cl. ..... 383/200; 53/133.1; 53/141; 206/484; 428/43; 493/199; 493/223; 493/228

[58] Field of Search ..... 206/484, 610, 611, 620, 206/632, 604; 383/103, 109; 156/153, 257; 428/43, 910; 53/133, 141, 142; 493/199-201, 223, 228

[56] References Cited

U.S. PATENT DOCUMENTS 2,257,823 10/1941 Stokes .
2,508,855 5/1950 Brown .
2,554,157 5/1951 Snyder .
2,817,618 12/1957 Hahn .
2,996,238 8/1961 Linde .
3,083,876 4/1963 Schwerder et al. ..... 53/133
3,467,250 9/1969 D'Elia et al. .
3,510,054 5/1970 Sanni et al. ..... 206/610
3,511,436 5/1970 Kessler .
3,520,471 7/1970 Faust .
3,608,815 9/1971 Bunch .
3,642,126 2/1972 Kurtz et al. ..... 206/604 X
3,761,013 9/1973 Schuster .
3,790,067 2/1974 Scheier .
4,125,665 11/1978 Bemmels et al. ..... 428/352
4,150,184 4/1979 Tesch ..... 428/43
4,407,872 10/1983 Horii .
4,543,279 9/1985 Kai .
4,557,385 12/1985 Robinson ..... 206/620
4,609,107 9/1986 Martin et al. ..... 206/610
4,743,123 5/1988 Legters et al. ..... 383/103
4,919,272 4/1990 Kai et al. ..... 206/620

FOREIGN PATENT DOCUMENTS 711603 6/1965 Canada .
2909276 9/1980 Fed. Rep. of Germany .
0032981 3/1977 Japan ..... 156/153
54-22484 8/1979 Japan .
55-39196 10/1980 Japan .
58-13680 1/1983 Japan .
61-142133 6/1986 Japan .
61-142159 6/1986 Japan .
62-52065 3/1987 Japan .
2035258 6/1980 United Kingdom .

*Primary Examiner*—Bryon P. Gehman
*Attorney, Agent, or Firm*—Oliff & Berridge

[57] ABSTRACT

Disclosed are a pouch for containing a material therein, a laminate film for the pouch, and a method for producing the pouch. The laminate film comprises a first plastic layer and at least one second plastic layer on which said first plastic layer is laminated. The first plastic layer is partially subjected to surface roughening treatment prior to the lamination, and surface irregularities are filled with a plastic material of the second plastic layer. In a pouch having substantially rectangular shape, at least one folded portion is provided at a side edge of the pouch. The surface roughened portion is positioned at and around the folded portion and at an external surface of the pouch. In one embodiment, the folded edge is provided at one side of the pouch and a heat sealed portion is provided at the other side edge thereof. In another embodiment, folded portions are provided at both side edges of the pouch and a heat-sealed portion is provided at a rear central portion thereof.

42 Claims, 3 Drawing Sheets

POUCH OR SACK FOR PACKING AND LAMINATE FILM THEREFOR AND METHOD FOR PRODUCING THE POUCH

Matter enclosed in heavy brackets [ ] appears in the original patent but forms no part of this reissue specification; matter printed in italics indicates the additions made by reissue.

BACKGROUND OF THE INVENTION

The present invention relates to a sack or pouch for packing a material therein and to a laminate film for the sack, and more particularly, to the sack and the laminate film which is easily tearable yet having sufficient fracture strength and sealability.

The present invention also relates to a method for producing such sack or pouch and for producing the laminate film therefor.

A composite film is generally available as a material of a sack or pouch. The composite film includes a polyethylene film laminated on an ordinary cellophane sheet or paper. When the pouch or the sack formed of the laminated film is required to be opened, a heat-sealed portion of the pouch can be manually torn, i.e., a user can [manurally] *manually* break the seal at the heat-sealed portion. Therefore, such type of pouch is widely available. However, the composite film does not provide sufficient fracture strength and fluid-tightness particularly against moisture. Accordingly, a content to be packed is subjected to limination.

In order to overcome these drawbacks, a plastic laminated film is used as a material of the sack or pouch so as to improve fracture strength and moisture resistivity. However, the plastic laminated film provides relatively high tearing strength, so that it would be rather difficult to manually tear a pouch open at its sealing portion. Therefore, a cutter or other jig must be used to open the pouch.

In case of the pouch formed of the above-described plastic laminated film, demand has been made for manually [open] *opening* the pouch at its heat-sealed portion. To meet with the demand, V-shaped or I-shaped notch is formed at the heat-seal portion. Such notches serve to concentrate tearing force thereat and to propergate the force along the tearing direction.

Such notches can be easily formed by the lamination film manufacturer prior to filling a content in the package or pouch. However, if the film manufacturer simply supplies a rolled lamination film to the lamination film users, it would be rather difficult for the users to form such notch at the heat-sealed portion of the pouch during pouch production and content packing processes.

Japanese Patent Publication 61-39228 discloses a pouch 1 in which a heat-sealed portion 2 is subjected to a plurality of minute scoring or scratching 3 without formation of V-shaped notch as shown in FIG. 1. These scratches 3 are formed to a sheet prior to the production of the pouch, i.e., prior to the heat-seal process. Alternatively, after *a* heat-sealed process, these scratches are formed at the heat-sealed portion 2.

In this case, it would be rather difficult to form the scratches at a sheet web so as to correctly align the scored or scratched portion with the heat sealed portion in a subsequent heat-seal process. On the other hand, during heat-seal process, it would be also difficult and time-consuming to form scratches at the heat-sealed portion.

SUMMARY OF THE INVENTION

It is therefore, an object of the present invention to overcome the above-described disadvantages and to provide an improved laminated film and a pouch which uses the laminated film.

Another object of this invention is to [provede] *provide* an improved method for producing such pouch.

Still another object of this invention is to provide such pouch or sack which is easily tearable yet having sufficient fracture strength, moisture resistivity and fluid-tightness.

Still another object of this invention is to provide such laminated film and a pouch which uses the laminated film having excellent outer appearance without any formation of notches.

Still another object of this invention is to provide the pouch which has a tearable portion at a position other than a heat-sealed portion.

These and other object of the present invention are attained by providing a manually tearable portion at a foled portion of a sack or pouch. A composite laminate film is used as a material of the pouch. The composite laminate film includes at least two films, and is subjected to surface roughening at an area corresponding to the folded portion. The roughening portion is formed only in one of the films, and the roughened surface is positioned at an external side of the pouch. The composite laminate film web having rectangular shape is heat-sealed together at both end portions, so that cylindrical member is provided. The cylindrical member is folded to obtain flat rectangular shape, and at least one end corresponding to a bottom or top portion of the pouch is also heat-sealed. As a result, there are at least one folded portion at one side of the pouch, one heat-sealed portion and at least one heat-sealed portion at a bottom of the pouch. The folded portion includes the above-mentioned surface roughened portion.

The roughened portion serves as an initial start-up of the tearing operation of the pouch. Further, minute bores or voids in the roughened portion [is] *are* impregnated with other material which is a material of another film of the composite film. Therefore, external surface of the pouch provides a flat surface without any notch nor scratch, so that excellent outer appearance results at the tearing portion.

The roughened portion may linearly [extends] *extend* in the composite film. Preferrably, the roughened portion may be meandered or lain in a zig-zag line. Alternatively, spot like dimples are discontinuously formed to provide the [roughned] *roughened* zone. The meandering and discontinuous formation can enlarge substantial width of the roughened zone at a position corresponding to the folded portion of the pouch.

The surface roughening treatment is performed prior to *a* heat-seal process, and at a position other than the heat-sealed portion. The roughened portion is provided by forcibly pressing the running web-like plastic film against a rough surface member (direct contact method). Alternatively, the plastic film is subjected to surface roughening by the application of laser beam, corona discharge, plasma discharge, etc (non-contact method). [Thus] *The thus* treated plastic film is laminated onto substrate film to provide a composite film web. Thereafter, the web is cut to a predetermined length so as to align the roughened portion with the folded portion of the pouch, and then the [cutted] *cut* composite film is folded and heat-sealed. The lamination is carried out by extruding the films. During the extrusion process, the substrate material is entered into bores or minute voids of the plastic film, so that external surface of the plastic film becomes flat, yet the roughened plastic film functions as [an] *a* propellant for tearing or breaking action of the folded portion of the pouch.

DETAILED DESCRIPTION OF THE PREFERRED EMBODIMENTS

Figure 1:
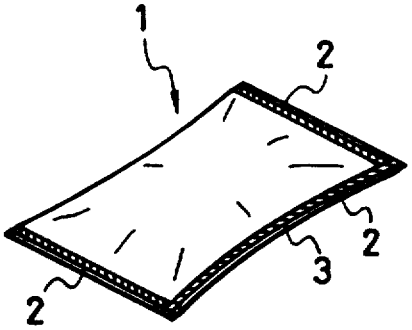
FIG. 1 PRIOR ART
FIG. 1 is a perspective view showing a conventional pouch or sack for packing a content therein.
Figure 2:
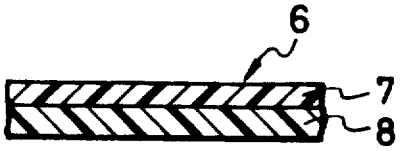
FIG. 2 is a cross-sectional view of a composite laminate film according to a first embodiment of the [prsent] *present* invention.

A plastic laminate film 6 according to a first embodiment is shown in FIG. 2. The plastic laminate film includes a polyethylene film 8 having a thickness of 40 microns and a polypropylene film 7 having a thickness of 20 microns laminated onto the film 8. The polypropylene film 7 is subjected to biaxial stretching. Alternatively, a single axial high stretching is preferrable if linear opening or tearing is desired.

Figure 3:
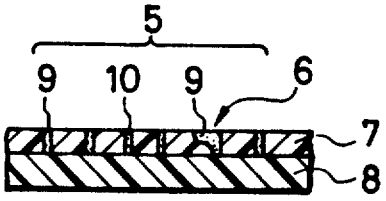
FIG. 3 is a cross-sectional view of a composite laminate film subjected to surface roughening according to the first embodiment.

As shown in FIG. 3, a roughened surface 10 is formed at the polypropylene film 7. The roughened surface 10 is positioned at *an* external side of a resultant pouch shown, for example, in FIG. 5(a), and at a folded portion 5 thereof. This roughened surface 10 serves to easily tear the pouch open.

Prior to the extrusion-lamination of the polypropylene film 7 onto the polyethylene film 8, the polypropylene film 7 is subjected to surface roughening treatment, so that scored or scratch portions 9 are formed on the film 7 as shown in FIG. 3. These bores or holes or dimples at the scored portions are filled with polyethylene material during subsequent lamination process. Therefore, the outer surface of the polypropylene film 7 becomes *a* flat surface.

Figure 13:
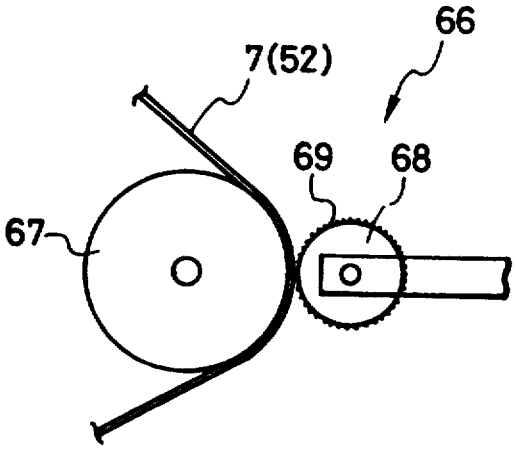

More specifically, FIG. 13 shows roughened surface forming machine 66 in which *is* disposed [are] a metal roller 67 and a rough surface forming roller 68, and the polypropylene film 7 travels between the rollers. Over the rough surface forming roller 68, a sand paper or emery paper 69 is provided. The running film 7 is formed with the scores or scratches 9 by the urging force of the sandpaper 69. The sandpaper has a particle size degree of No. 100 (defined by Japanese Industrial Standard JIS R-6001 which substantially corresponds to ANSI B 74.18 FEPA 30GB). *The sandpaper or emery paper inherently creates densely formed and randomly oriented surface irregularities.*

Since the roughened surface 10 is positioned at *an* external side of the pouch and at a folded portion thereof, the pouch is easily opened manually without any heavy manual force nor cutting means.

Figure 5A:
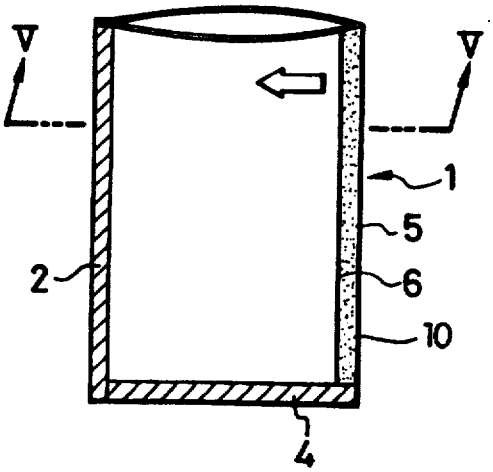
FIG. 5(a) is a perspective view showing a pouch according to a first embodiment of the present invention.
Figure 5B:
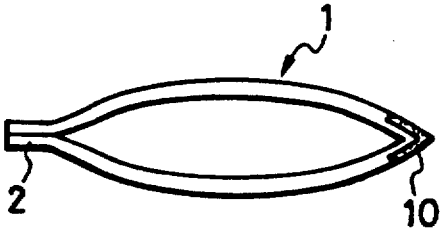
FIG. 5(b) is a cross-sectional view taken along the line V—V of FIG. 5(a)

A pouch 1 formed of the lamination sheet 6 is shown in FIGS. 5(a) and 5(b). The pouch 1 has two heat-sealed portions, i.e., a side seal 2 and a bottom seal 4. Of course, an open top portion is also heat-sealed after a content is filled in the pouch. In the pouch 1, there is a single folded portion 5, and the surface roughened portion 10 is provided at the folded portion 5 only. As shown in FIG. 5(b), the surface roughened portion 10 is positioned at an external side of the pouch 1. Therefore, the content in the pouch 1 is in contact with the polyethylene film 8.

Figure 6A:
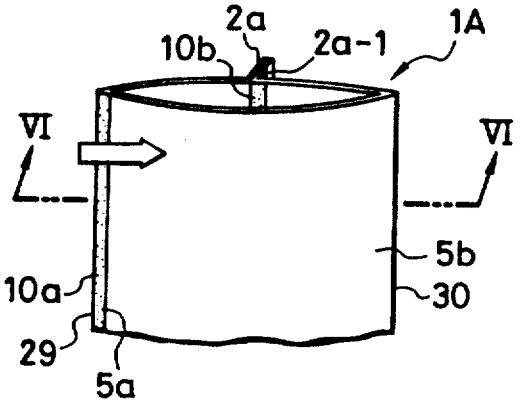
FIG. 6(a) is a perspective view showing a pouch according to a second embodiment of the present invention.
Figure 6B:
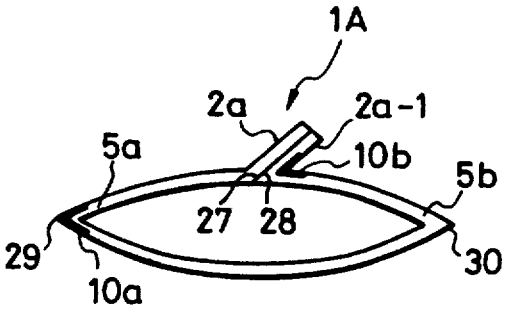
FIG. 6(b) is a cross-sectional view taken along the line VI—VI of FIG. 6(a)
Figure 7:
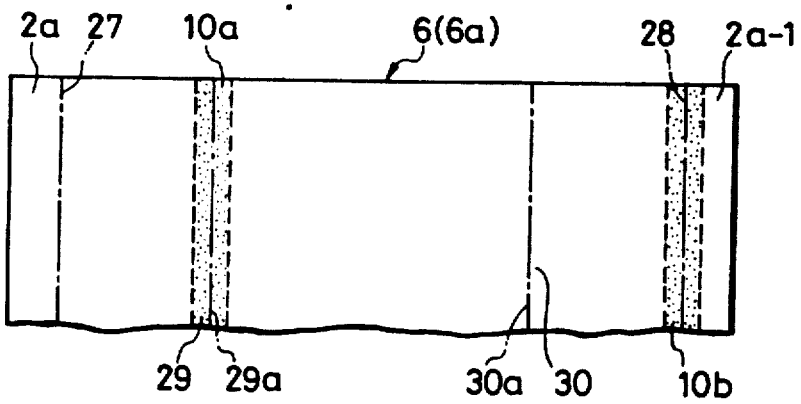
FIG. 7 is an exploded view of FIG. 6(a)

FIGS. 6(a) [throu] *through* 7 show a pouch 1A according to a second embodiment of the present invention. The pouch 1A is of pillow bag type in which there are two side folded portions 5a and 5b and a central heat sealed portion 2a at a rear surface of the bag 1A. As best shown in FIG. 7, the rear heat-sealed portion 2a is provided at both longitudinal end portions of the laminated film web 6. The rear-heat sealed portion 2a is defined by folding lines 27 and 28, and roughened surface area 10b is provided at and around the one of the folding lines 28. The pillow type pouch 1A has two side edges 29 and 30 which are defined by folding lines 29a and 30a. Further, another roughened surface area 10a is provided at and around one of the [foding] *folding* lines 29a which is positioned around one of the folding lines 29a which is positioned spaced away from the folding line 28 in comparison with the other folding line 30a. As shown in FIG. 6(a), the pouch 1A is opened from the side folded line 29 on which the surface roughened portion 10a is provided. Further, the other surface roughened portion 10b is provided at the heat sealed portion 2a-1 which is positioned [farer] *further* than the confronting heat sealed portion 2a with respect to the side edge line 29. Therefore, the linear opening or tearing operation is smoothly carried out even at the rear central heat sealed portion 2a-1. As best shown in FIG. 6(b), the surface roughened portions 10a and 10b are positioned at *an* outside or external surface of the pouch 1A. Of course, upper and lower open ends of the pillow type 1A are also heat sealed, and the rear central heat sealed portion 2a projects outside of the pillow.

Figure 8A:
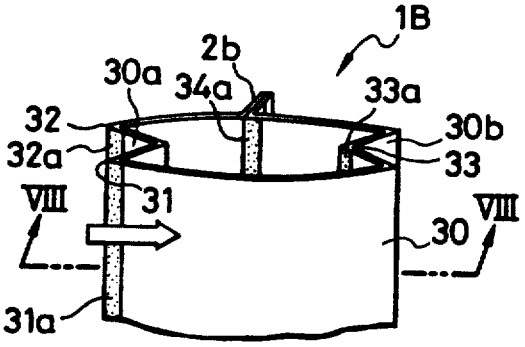
FIG. 8(a) is a perspective view showing a pouch according to a third embodiment of this invention.
Figure 8B:
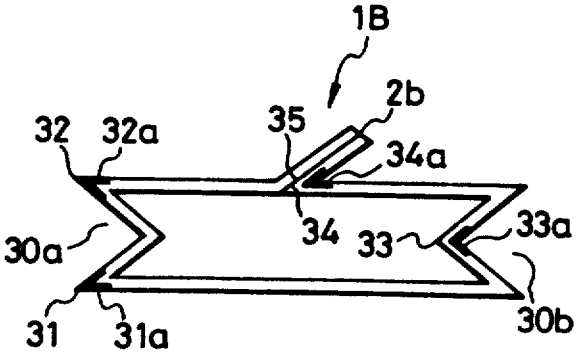
FIG. 8(b) is a cross-sectional view taken along the line VIII—VIII of FIG. 8(a)

FIGS. 8(a) to 8(b) show a gazette type pouch 1B in which each of the side portions is folded into M-shape in cross-section as best shown in FIG. 8(b). This type of pouch 1B is particularly available for containing therein

*a* large amount of content, and for providing self-upstanding function. In FIG. 8(a), assuming that the pouch is opened from a direction shown by an arrow, surface roughened portions 31a and 32a are provided at and around two ridge portions 31 and 32 those positioned at one of the gazette portions 30a. Another surface roughened portion 33a is provided at and around a valley portion of the other gazette portion 30b. Further, a rear central sealing portion 2b projects outside of the pouch 1B, and a surface roughened portion 34a is provided at and around one of the folding line 34 of the sealing portion 2b. These surface roughened portions 31a,32a, 33a and 34a are positioned at *an* external side of the pouch 1A as shown in FIG. 8(b). The folding line 34 is positioned [farer] *further* than a [folidng] *folding* line 35 with respect to the tearing starting edges 31 and 32. Of course, upper and lower open ends are also heat sealed.

Figure 11:
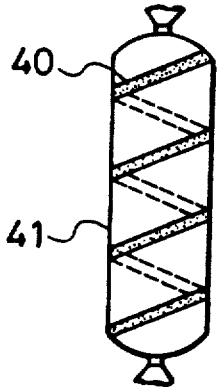
FIG. 11 is a perspective view showing a modified embodiment according to the present invention.

FIG. 11 show a cylindrical packing bag 41 applicable for packing a sausage. In this case, surface roughened portion 40 for opening purpose is spirally arranged *to form a guide line extending across a non-heat-sealed portion of the pouch body for tearing the pouch body along the guide line.* Therefore, the package 41 can be successively removed in accordance with the user's demand.

Figure 4:
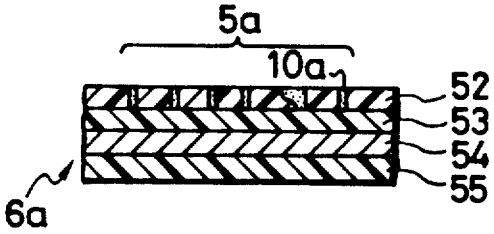
FIG. 4 is a cross-sectional view showing a composite laminate film according to a second embodiment of this invention.

FIG. 4 shows a cross-sectional view of a composite laminate film 6a according to a second embodiment of this invention. The composite laminate film 6a includes a polyester film 52 having a thickness of 12 microns, a polyethylene film 53 having a thickness of 15 microns, an aluminum foil 54 having a thickness of 7 microns, and polyethylene film 55 having a thickness of 30 microns. A surface of the polyester film 52 is formed with a surface roughened portion 10a which is produced in a manner the same as that in the first embodiment shown in FIG. 3. The composite laminate film 6a is also available for the pouches or sacks shown in FIGS. 5(a)–5(b), FIGS. 6(a)–7, FIGS. 8(a)–8(b), and FIG. 11.

Figure 9:
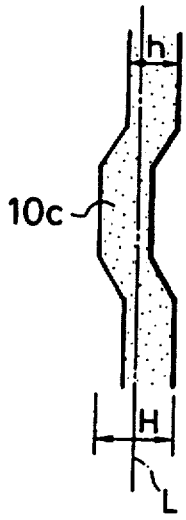
FIGS. 9 and 10 show configurations of roughened areas according to this invention.
Figure 10:
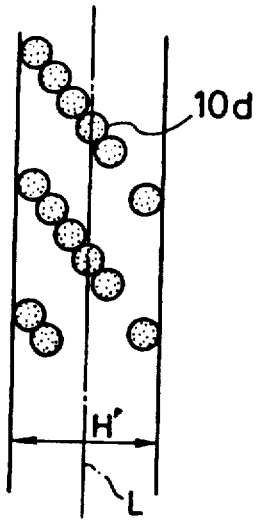

FIGS. 9 and 10 show modifications of the surface roughened zones. In an embodiment shown in FIG. 9, surface roughened zone 10c [is] *comprises a group of densely formed and randomly oriented surface irregularities,* meandered or lain in a zig-zag line. The surface roughened zone 10c is provided at, for example, the polyester film 52 shown in FIG. 4. Even though the meandered line has a small width h, resultant meandered width H becomes large, so that the surface roughened zone can surely [occupies] *occupy* an area at and adjacent the folded line L. As described above, in the present invention, the surface roughening treatment is carried out on the laminated film web, prior to heat-sealing operation for making the pouch. Therefore, substantial increase in width H of the surface [roghened] *roughened* zone has advantages in that the zone can surely be positioned at the folded line and a portion adjacent thereto.

The same is true with respect to an embodiment shown in FIG. 10. In this embodiment, a plurality of circular rough surface portions 10c are arranged in a plurality of rows, each rows being directed in parallel and oblique with respect to the folding line L at an angle of 45 degrees. *As may be seen in FIG. 10, each circular rough surface portion 10c contains densely formed and randomly oriented surface irregularities.*

Because of the continuous meandered rough surface zone 10c (FIG. 9) and discontinuous and obliquely arranged rough surface zone 10d (FIG. 10), substantial width of the roughened portion can be increased to H or H'. Therefore, the roughened portion can be positioned without fail at and adjacent the folded line L. Such arrangement can minimize roughened treatment area. Therefore, resultant pouch can provide improved mechanical strength and gas barrier characteristics, yet providing easy tearing at the folded portion positioned at at least one of the side edges of the pouch.

In view of the foregoing, according to the pouch of this invention, *a* surface roughened portion is provided at the folded portion of the pouch disposed at at least one of the side edges thereof, [and] the surface roughened portion is positioned at the external side of the pouch, *and* the pouch is easily opened with small manual force. Further, even by the formation of the surface roughened portion, the surface [irreguralities is] *filled with the irregularities are* other plastic material, so that excellent sealability is obtainable with excellent outer appearance. Accordingly, the external surface of the pouch is available for sufficient printing regardless of the folded portion.

Figure 12:
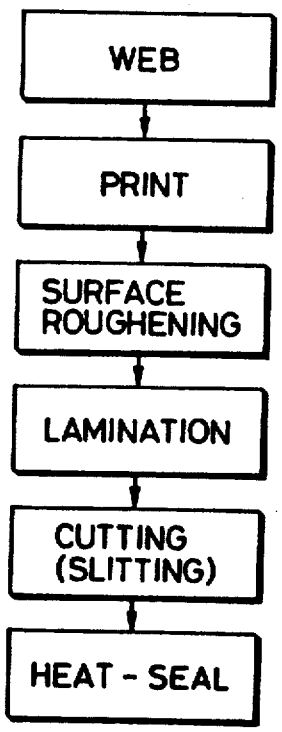
FIG. 12 is a block diagram showing a process for producing a pouch for packing [purpose] *purposes* according to this invention; and, FIG. 13 is a schematic illustration showing a device for forming *a* roughening zone to a plastic film prior to its [laminataion] *lamination* onto a substrate.

Next a method of producing such laminated film and a method for producing such pouch will be described with reference to FIG. 12. The following description will be premised on the composite film shown in FIG. 4. First, row material film webs are prepared such as polyester film 52 having a thickness of 12 microns, aluminum foil 54 having a thickness of 7 microns, and polyethylene film 53 having a thickness of 15 microns. The polyester film 52 has one surface subjected to printing, and the other surface subjected to surface roughening by the method shown in FIG. 13. Thereafter, these films and a polyethylene film 55 having a thickness of 30 microns are extrusion-laminated together. By this lamination process, the surface irregularities formed at the surface roughening step [is] *are* filled with polyethylene material of the polyethylene film 53. In the surface roughening step, instead of the [emplyment] *employment* of the sand-paper, *a* laser beam is used to provide a plurality of perforations or to provide linear recesses. Alternatively, corona discharge, plasma discharge and [untrasonic] *ultrasonic* wave are also available for forming the surface irregularities.

The surface roughening is carried out so as to provide the surface roughened zones having a predetermined width by a given intervals corresponding to the size and shape of the pouch.

Thus prepared laminated film 6a is subjected to cutting or slitting, and thereafter, each of the cut segments is folded and heat-sealed. In this case, there are surface roughened zone at the folded portion, i.e., at least one of the side edges of the pouch. If desired, additional surface roughened zone is provided whose position corresponds to the rear central folded portion of the pouch. Of course, this additional surface roughened zone is provided prior to the lamination step.

While the invention has been described in detail and with reference to specific embodiments thereof, it will be apparent for those skilled in the art that various changes and modifications can be made therein without departing from the spirit and scope of the invention.

What is claimed is:

1. A laminate film [for] pouch comprising:

an external plastic layer; and[,]

at least one internal plastic layer on which said external plastic layer is laminated; said external plastic layer being formed with a surface roughened portion at a *non-heat-sealed* position [corresponding to a folded portion of a resultant] *crossing a fold line of the* pouch.

2. The laminate film *pouch* as claimed in claim 1, wherein said external plastic layer comprises [polypropyrene] *polypropylene* film.

3. The laminate film *pouch* as claimed in claim 2, wherein said [polypropyrene] *polypropylene* film is a single axial stretching film.

4. The laminate film *pouch* as claimed in claim 1, wherein said external plastic layer comprises polyester film.

5. The laminate film *pouch* as claimed in claim 1, wherein said internal plastic layer comprises polyethylene film.

6. The laminate film *pouch* as claimed in claim 4, further comprising an aluminum foil laminated with said internal plastic layer, and a plastic film laminated with said aluminum foil.

7. The laminate film *pouch* as claimed in claim 1, wherein said surface roughened portion [has] *forms a* continuous meandered [arrangement, said meandered portion] *line* having a small width, and *a large* resultant [surface roughened portion having a wide] *meandered* width extending [over said folded portion] *across said fold line.*

8. The laminate film *pouch* as claimed in claim 1, wherein said surface roughened portion is formed with a plurality of circular recesses arranged in groups of rows, said groups being directed in parallel with each other and extending obliquely with respect to [a folded line of] said [folded portion] *fold line.*

9. The laminate film *pouch* as claimed in claim 1, wherein said surface roughened portion is formed with [a] surface [irregularlities] *irregularities* into which a material of said internal plastic layer is filled.

10. A pouch comprising: a laminated film defining a rectangular pouch body; said laminated film comprising an external plastic layer and an internal plastic layer, said laminated film being formed with at least one folded portion *containing a fold line*, and a heat-sealed portion connecting free ends of said laminated film, *a non-heat-sealed area of* said folded portion being formed with a surface roughened portion which *crosses said fold line and* is formed at the external side of said pouch.

11. The pouch as claimed in claim 10, wherein said folded portion [is positioned at] *form* one side edge portion of said pouch, and said heat-sealed portion [is positioned at the other] *forms another* side edge portion thereof.

12. The pouch as claimed in claim 10, wherein two folded portions [are provided at both] *form two* side edge portions of said pouch, said heat-sealed portion projecting outwardly at a rear portion of said pouch.

13. The pouch as claimed in claim 12, further comprising a second surface roughened portion at a folded portion of said heat-sealed portion.

14. The pouch as claimed in claim 10, wherein each of *two* side edge portions of said pouch comprises three folding lines to provide two ridge portions and one valley portion positioned between said two ridge portions, one of the side edge portions being formed with said surface roughened portions at said ridge portions, and the other side edge portion being formed with said surface roughened portion at said valley portion.

15. The pouch as claimed in claim 14, wherein said heat-sealed portion projects outwardly from a rear portion of said pouch, and a second surface roughened portion is provided at and around a folded line of said heat-sealed portion.

16. The pouch as claimed in claim 10, wherein said external plastic layer comprises [polypropyrene] *polypropylene* film.

17. The pouch as claimed in claim 16, wherein said [polypropyrene] *polypropylene* film is a single axial stretching film.

18. The pouch as claimed in claim 10, wherein said external plastic layer comprises polyester film.

19. The pouch as claimed in claim 10, wherein said internal plastic layer comprises polyester film.

20. The pouch as claimed in claim 18, further comprising an aluminum foil laminated with said internal plastic layer, and a plastic film laminated with said aluminum foil.

21. The pouch as claimed in claim 10, wherein said surface roughened portion [has] *forms a* continuous meandered [arrangement, said meandered portion] *line* having a small width, and *a large* resultant [surface roughened portion having a wide] *meandered* width extending [over said folded portion] *across said fold line*.

22. The pouch as claimed in claim 10, wherein said surface roughened portion is formed with a plurality of circular recesses arranged in groups of rows, said groups being directed in parallel with each other and extending obliquely with respect to [a folded line of] said [folded portion] *fold line.*

23. The pouch as claimed in claim 10, wherein said surface roughened portion is formed with [a] surface [irregularlities] *irregularities* into which a material of said internal plastic layer is filled.

24. A method for producing a pouch comprising the steps of:

preparing a rectangular first plastic film web and at least one rectangular second plastic film web;

roughening partial surface portions of [a] one surface of said first plastic film web, said partial portions [corresponding to folded portions] *crossing a non-heat-sealed portion of said web corresponding to at least one fold line* of said pouch;

laminating together said first and second plastic film webs to provide a composite film;

cutting said composite film into rectangular segments;

folding said rectangular [segment,] *segments along said fold line;* and heat-sealing free ends of said rectangular [segment] *segments.*

25. The method as claimed in claim 24, wherein [said] *the* roughening step is performed by pressing a rigid roughening member onto said one surface of said first plastic film web.

26. The method as claimed in claim 24, wherein said roughening step is performed by applying one of laser beam, corona discharge, plasma discharge and ultrasonic wave onto parts of said first plastic film web.

27. The method as claimed in claim 24, further comprising the step of printing the other surface of [said] *the* first plastic film web prior to said roughening step.

*28. The laminate film pouch as claimed in claim 1, wherein said surface roughened portion is formed at a portion of the pouch between two opposite heat sealed edges of the pouch.*

*29. The pouch as claimed in claim 10, wherein said surface roughened portion is formed at a portion of the pouch between two opposite heat sealed edges of the pouch.*

*30. The method as claimed in claim 24, wherein said partial surface portions are roughened at a portion of said web corresponding to a portion of the pouch between said heat sealed free ends of said rectangular segments.*

*31. A pouch comprising:*

*a pouch body formed of a laminate sheet including at least two layers of material, the laminate sheet comprising:*

*a first layer formed of a plastic material and being provided with a tear facilitating surface roughened portion comprising surface irregularities;*

*a second layer laminated to the first plastic layer; and*

*filling material at least partially filling the surface irregularities;*

*wherein the tear facilitating surface roughened portion forms a guide line extending across a non-heat-sealed portion of the pouch body for tearing the pouch body along the guide line.*

*32. The pouch as claimed in claim 31, wherein said first layer is an exterior layer of said pouch.*

*33. The pouch as claimed in claim 31, wherein the filling material comprises a resin.*

*34. The pouch as claimed in claim 31, wherein the second layer is formed of a plastic material and wherein the filling material is the same as the plastic material of the second layer.*

*35. The pouch as claimed in claim 34, wherein the filling material is material flowed from the second layer into the surface irregularities during lamination of the first and second layers.*

*36. The pouch as claimed in claim 31, wherein said surface irregularities comprise a plurality of scores or scratches.*

*37. A pouch comprising:*

*a pouch body formed of a laminate sheet including at least two layers of material, the laminate sheet comprising:*

*a first layer formed of a plastic material and being provided with a tear facilitating surface roughened portion comprising surface irregularities;*

*a second layer laminated to the first plastic layer; and*

*filling material at least partially filling the surface irregularities;*

*wherein said surface roughened portion has a continuous meandered arrangement extending across a non-heat-sealed portion of the pouch body and providing a resultant surface roughened portion of relatively large width.*

*38. A pouch comprising:*

*a pouch body formed of a laminate sheet including at least two layers of material, the laminate sheet comprising:*

*a first layer formed of a plastic material and being provided with a tear facilitating surface roughened portion comprising surface irregularities;*

*a second layer laminated to the first plastic layer; and*

*filling material at least partially filling the surface irregularities;*

*wherein said surface roughened portion is formed of a plurality of circular rough surface portions arranged in a plurality of rows directed parallel to each other and obliquely to an edge of the pouch and extending across a non-heat-sealed portion of the pouch body.*

*39. A sheet product comprising at least one plastic sheet having a tear facilitating surface roughened portion, said surface roughened portion comprising a group of densely formed and randomly oriented surface irregularities, said group being in the form of a continuous meandered arrangement providing a resultant surface roughened portion of relatively large width.*

*40. The sheet product claimed in claim 39, wherein said sheet product is a sealed pouch.*

*41. A sheet producing comprising at least one plastic sheet having a tear facilitating surface roughened portion, said surface roughened portion being formed of a plurality of circular rough surface portions, each containing densely formed and randomly oriented surface irregularities, arranged in a plurality of rows directed parallel to each other and obliquely to an edge of the product.*

*42. A sheet product as claimed in claim 41, wherein said sheet product is a sealed pouch.*

* * * * *